United States Patent
Chen et al.

(10) Patent No.: US 7,215,375 B2
(45) Date of Patent: May 8, 2007

(54) METHOD FOR LINE AVERAGE DIFFERENCES BASED DE-INTERLACING

(75) Inventors: Yueyong Chen, Taipei (TW); Jian Zhu, Taipei (TW)

(73) Assignee: Ali Corporation, Taipei (TW)

( * ) Notice: Subject to any disclaimer, the term of this patent is extended or adjusted under 35 U.S.C. 154(b) by 512 days.

(21) Appl. No.: 10/865,922

(22) Filed: Jun. 14, 2004

(65) Prior Publication Data

US 2005/0151879 A1 Jul. 14, 2005

(30) Foreign Application Priority Data

Jan. 13, 2004 (TW) .............................. 93100847 A

(51) Int. Cl.
*H04N 7/01* (2006.01)
(52) U.S. Cl. ...................... 348/448; 348/458
(58) Field of Classification Search ........ 348/448–452, 348/441, 458, 459
See application file for complete search history.

(56) References Cited

U.S. PATENT DOCUMENTS 6,269,484 B1 * 7/2001 Simsic et al. ............... 725/151
6,348,949 B1 2/2002 McVeigh
6,788,312 B1 * 9/2004 Azar et al. .................. 345/694
7,057,665 B2 * 6/2006 Jung et al. .................. 348/452

* cited by examiner

*Primary Examiner*—Michael H. Lee
(74) *Attorney, Agent, or Firm*—Birch, Stewart, Kolasch & Birch, LLP

(57) ABSTRACT

A method for line average de-interlacing decodes a picture to form macro blocks (MBs), calculates line average values to form a threshold, produces de-interlacing flags by comparing the line average values and the threshold, realizes Temporal Extension action and performs Devour action. The Temporal Extension action determines if the current de-interlace flag is set as WEAVE, determines if the flags in the same position in other flag buffers are set as BOB and sets the de-interlace flags as BOB2. The Devour action determines if the de-interlace flag is BOB. If positive, it calculates the amount of BOB data within a predetermined area around the current MB, determines if the result is smaller than the BOB threshold and sets the de-interlace flag as WEAVE. Otherwise, it calculates the amount of the WEAVE data, determines if the result is smaller than the WEAVE threshold and sets the de-interlace flag as BOB2.

12 Claims, 5 Drawing Sheets

METHOD FOR LINE AVERAGE DIFFERENCES BASED DE-INTERLACING

This Non-provisional application claims priority under 35 U.S.C. § 119(a) on patent application Ser. No(s). 93100847 filed in Taiwan on Jan. 13, 2004, the entire contents of which are hereby incorporated by reference.

FIELD OF THE INVENTION

The present invention is directed to a method for line average differences based de-interlacing, and more particularly, to a method for decoding MPEG-2 images.

BACKGROUND OF THE INVENTION

Recently, multimedia has become easy to obtain for people. The source of multimedia can be, for example, a television program, a movie, a video compact disk (VCD), or a digital video disk (DVD). In these sources, the images mainly fall into two categories. One is non-interlaced images, which are shown line by line, and the other is interlaced images, which are shown in alternate lines. These images are primarily decoded in accord with the MPEG-2 standard.

In the process for encoding/decoding MPEG-2 images, one general processing method is to de-interlace the contents of the interlaced film. WEAVE and BOB methods are common ways of de-interlacing. The WEAVE method merges two information fields to form a frame and the BOB method use a single information field to form a frame.

Obviously, the frame formed via the WEAVE method has more information and is clearer. The frame formed via the BOB method is vaguer and some static portions will jiggle, such as the logo of the television station.

Certainly, the WEAVE method also has drawbacks. When macro block (MB) data is interlaced, the motion portions in the frame formed via the WEAVE method usually have some flaws with comb shapes, which are called mice teeth.

To a certain extent, the advantages of these two methods can be combined. The BOB method is used to eliminate the mice teeth in the motion portions and the WEAVE method is used to make the static portions clearer. This kind of method is called motion adaptive de-interlacing.

The algorithm disclosed in U.S. Pat. No. 6,348,949 employs a data comparison method to determine the state of an area. This algorithm focuses on a series of decoded images and some images that needn't be decoded (applicable for television). Hence, the cost for realizing this method is higher and the necessary bandwidth of the memory is also higher.

Reference is made to FIG. 1, which is a block diagram of a current design for a de-interlacing system applied to a video stream. FIG. 1 includes: a MPEG-2 interlaced picture data encoder 10, an encoded compressed MPEG-2 video stream 102, a MPEG-2 de-interlacing device 104, a MPEG-2 data stream decoder 106, a MPEG-2 decoder with line average extractor 108, a line average based de-interlacing determinator 110, a line average based de-interlacing bitmap 112, a block data subset 114, decoding line average data 116, picture data 118, a de-interlacing video rendering unit using line average based de-interlacing bitmap 120 and a progressive display 122.

The MPEG-2 interlaced picture data encoder 10 is an MPEG-2 encoder, which is used for decoding the interlaced picture data according the MPEG-2 standard and passing the encoded compressed MPEG-2 video stream 102 to the MPEG-2 de-interlacing device 104. The MPEG-2 de-interlacing device 104 includes the MPEG-2 data stream decoder 106 and de-interlacing video rendering unit using line average based de-interlacing bitmap 120. The MPEG-2 data stream decoder 106 includes the MPEG-2 decoder with line average extractor 108, line average based de-interlacing determinator 110 and line average based de-interlacing bitmap 112.

The MPEG-2 decoder with line average extractor 108 generates the block data subset 114 and decoding line average data 116 during decoding and passes them to the line average based de-interlacing determinator 110. The line average based de-interlacing determinator 110 produces the line average based de-interlacing bitmap 112, which has two bits provided to indicate if each MB of a picture is a motion portion or motionless portion.

The MPEG-2 decoder with line average extractor 108 produces and passes the picture data 118 to the de-interlacing video rendering unit using line average based de-interlacing bitmap 120. Then, the processed picture is shown on the progressive display 122.

Accordingly, the conventional de-interlacing system and method mentioned above still have some drawbacks that could be improved. The present invention aims to resolve the drawbacks in the prior art.

SUMMARY OF THE INVENTION

An objective of the present invention is to provide a method for line average differences based de-interlacing that can resolve the drawbacks in the prior art.

For reaching the objective above, the present invention has the following features:

(1) The present invention employs the MB information of the encoding/decoding video stream to determine the motion of MBs. The present invention uses the continuity and relativity of the motion to add a Temporal Extension module (a temporal average filter) and a Devour module (a spatial average filter) to make the determination more accurate.

(2) The difference between the present invention and the patent mentioned above is that the present invention integrates these added modules with the decoder to lower the cost and the bandwidth requirement of the memory and make the determination for adjusting the adaptive threshold more rational.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION

Figure 1:
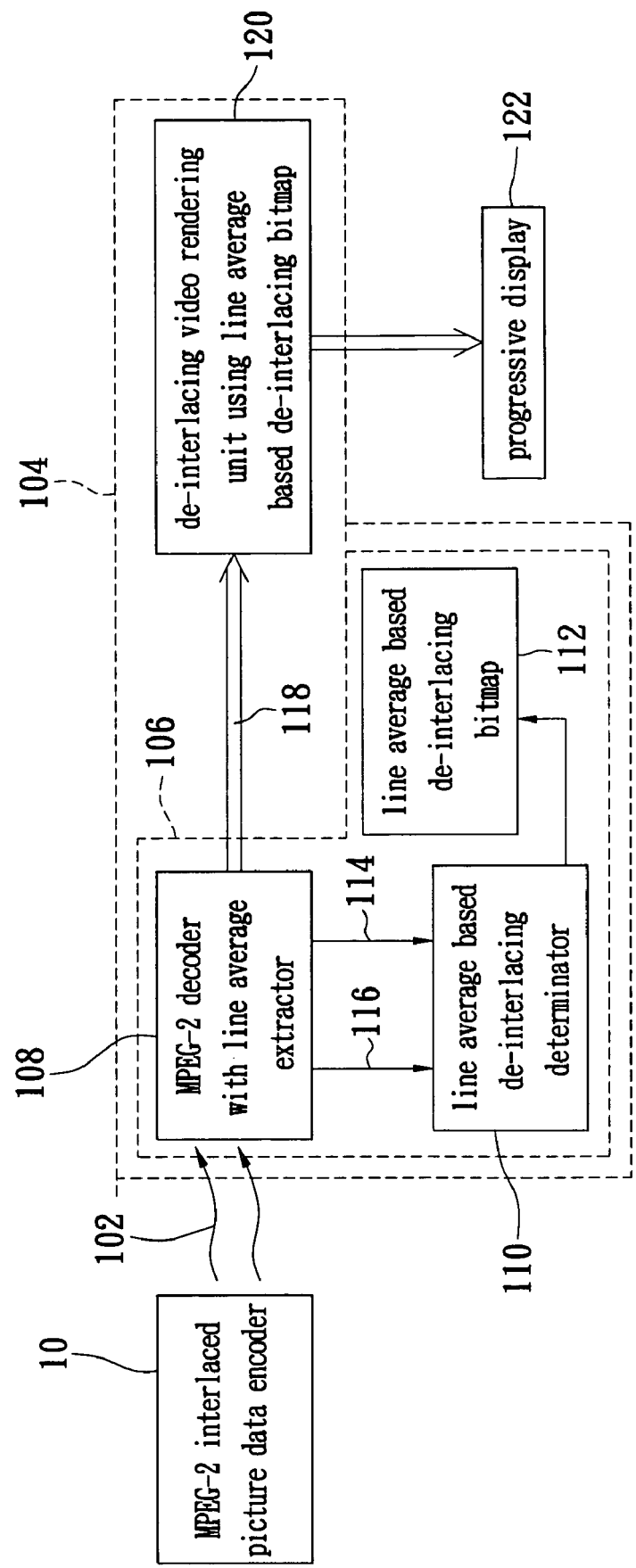
FIG. 1 is a block diagram of a current design for a de-interlacing system applied to a video stream.
Figure 2:
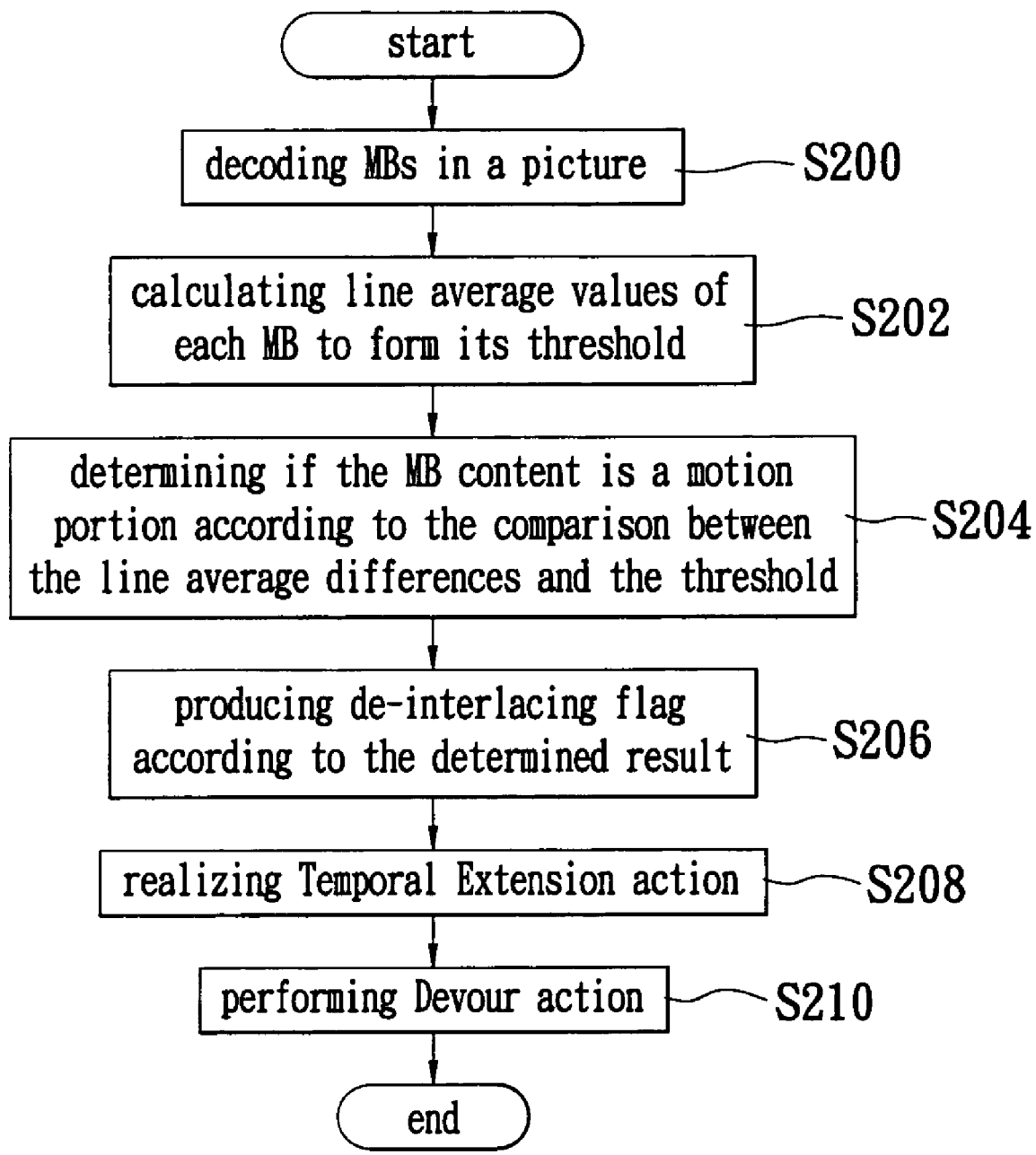
FIG. 2 is a flowchart of a method for line average de-interlacing in accordance with the present invention.

Reference is made to FIG. 2, which is a flowchart of a method for line average de-interlacing in accordance with the present invention. The method includes: decoding MBs in a picture (S200); calculating line average values of each MB to form its threshold (S202); determining if the MB content is a motion portion according to the comparison between the line average differences and the threshold (S204); producing de-interlacing flag according to the determined result (S206); realizing Temporal Extension action (S208); and performing a Devour action (S210).

The line average value is an average of luminance for pixels in same horizontal or vertical line. Regarding the video stream with a frame picture structure, the present invention has a full mode and a half mode for calculating the line average value. In the full mode, for each MB, the average value for each horizontal and vertical line is calculated. While in the half mode, the average values for every other line in both horizontal and vertical directions are calculated. In the present invention, only the line averages for luminance are calculated. Further, the present invention uses a byte as a unit to store each line average. For each MB, the present invention needs 32 bytes to store a line average value for the full mode and 16 bytes for the half mode.

For field picture structure, the present invention only calculates the line average in the bottom field. The present invention uses data of a MB to generate two de-interlace flags for two MBs. In the horizontal direction, the present invention calculates the first 8-line average for the first MB and second 8-line average for the second MB. In the vertical direction, the present invention calculates the 16-line average for the both MB.

When decoding, the 32 (16) bytes average data in current MB will differ from the 32 (16) bytes average data in respective MB in the previous decoded picture. (For the first picture in the video stream, the previous decoded picture is absent. Hence, the present invention will set a default value.) The difference will be compared with a threshold. If the absolute difference is beyond the threshold, the present invention will consider the respective MB to be a motion portion and set the de-interface flag for the current MB to BOB. Otherwise, the present invention will consider the respective MB to be a motionless portion and set the de-interface flag for current MB to WEAVE.

After that, the present invention will update the current line average values to the buffer where the previous average values are stored. The present invention needs 2 bits to store the de-interlacing flag for each MB and needs at least a 36×45×32 byte buffer to store the line average data for each MB in the previous picture. Since the de-interlace flag will be used in a display sequence, the present invention needs three 45×36×1 bit buffers to store these flags.

The present invention uses the line average value and the pixel data in the diagonal direction (from (0,0) to (15,15)) to judge the activities of the image content in the current MB. Generally, if the content is active, the present invention will increase the threshold value. Otherwise, the present invention will decrease the threshold value.

Figure 3:
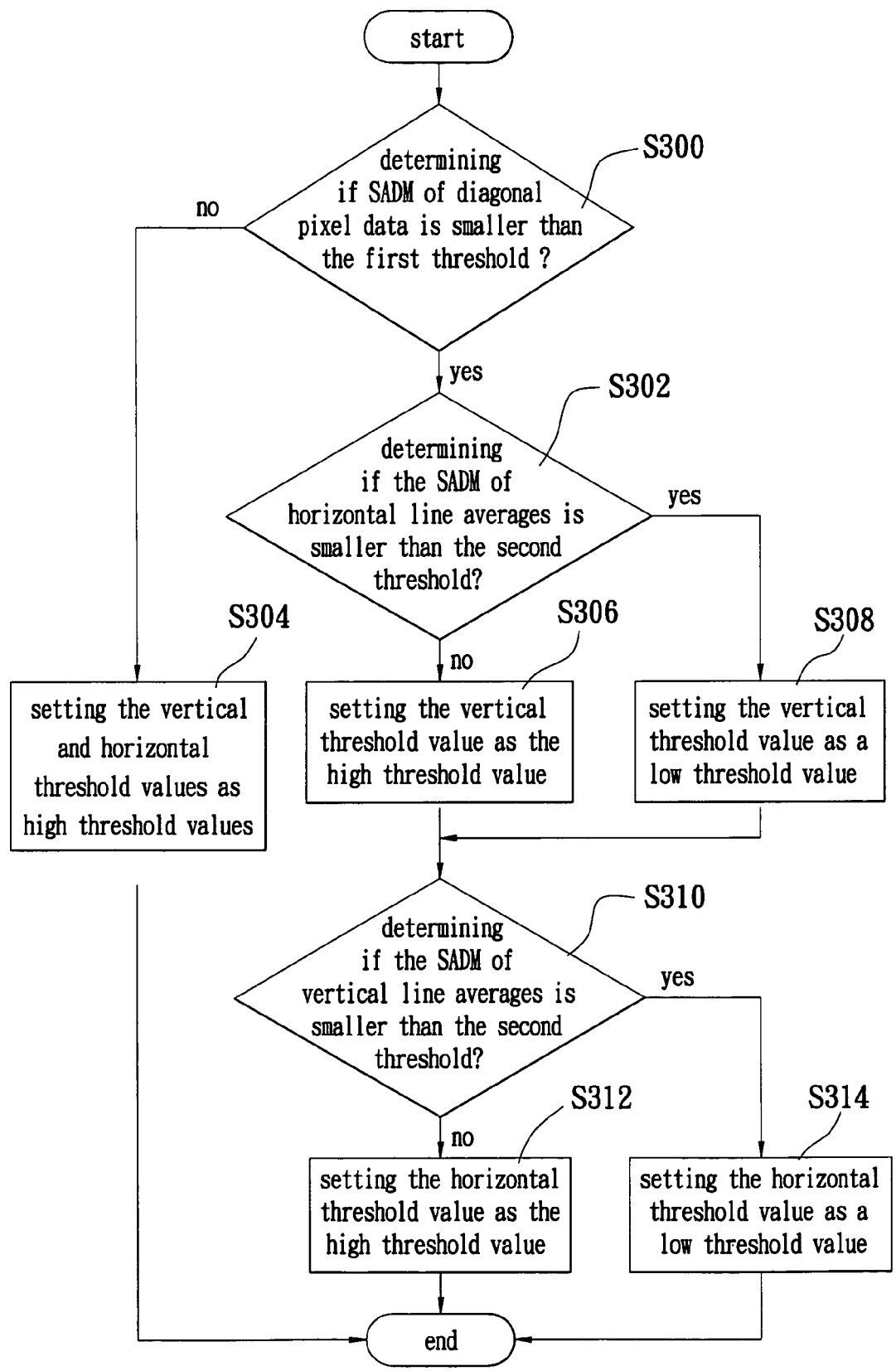
FIG. 3 is a flowchart for producing adaptive threshold for each MB in accordance with the present invention.

Reference is made to FIG. 3, which is a flowchart for producing the adaptive threshold in accordance with the present invention. The flowchart includes: determining if the sum of the absolute difference to the mean (SADM) of diagonal pixel data is smaller than the first threshold (S300); if negative, setting the vertical and horizontal threshold values as high threshold values (S304); if positive, determining if the SADM of horizontal line averages are smaller than the second threshold (S302); if negative, setting the vertical threshold value as the high threshold value (S306); if positive, setting the vertical threshold value as a low threshold value (S308); then, determining if the SADM of vertical line averages is smaller than the second threshold (S310); if negative, setting the horizontal threshold value as the high threshold value (S312); and if positive, setting the horizontal threshold value as a low threshold value (S314).

Figure 4:
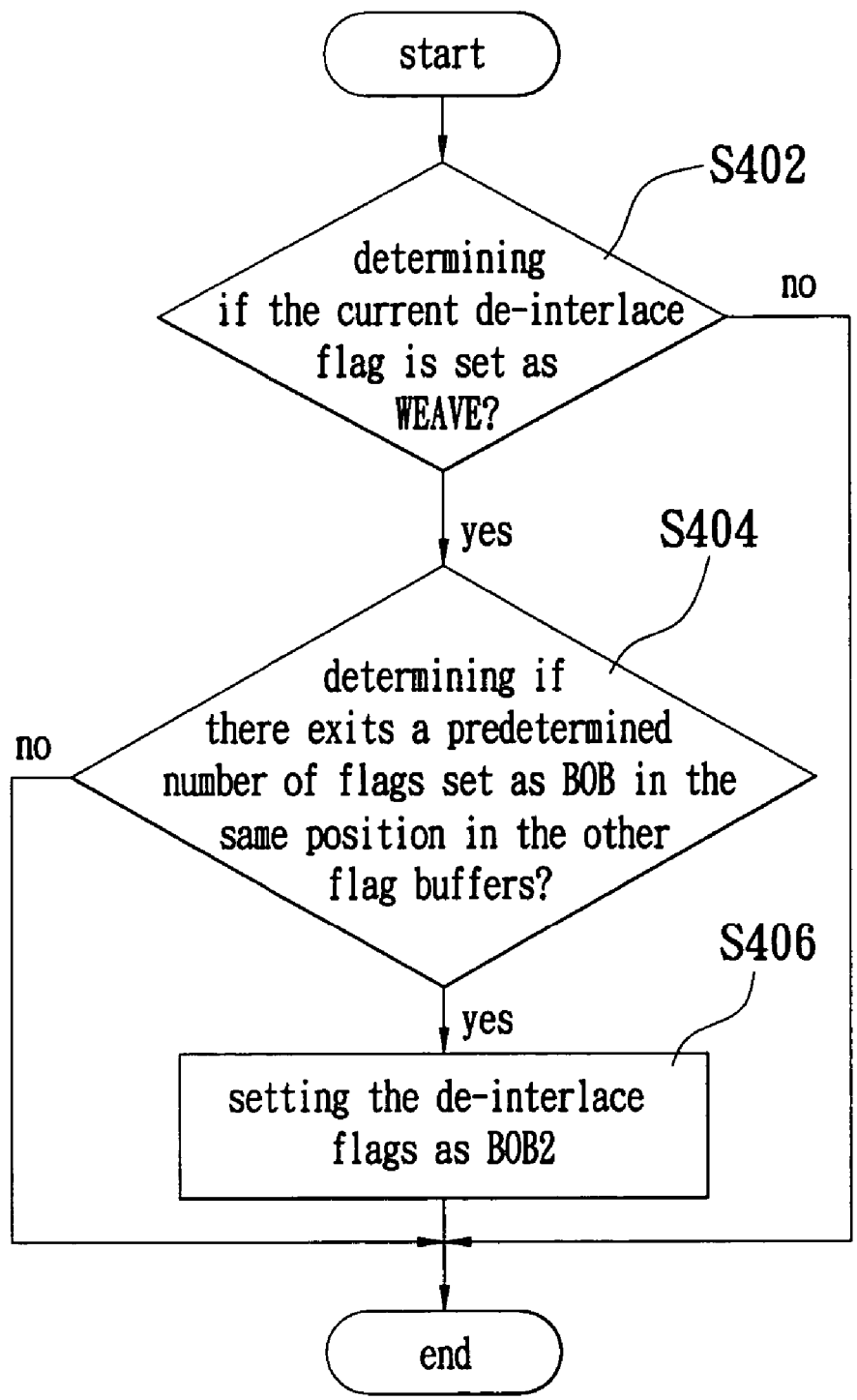
FIG. 4 is a flowchart for performing a Temporal Extension action in accordance with the present invention.

Reference is made to FIG. 4, which is a flowchart for performing a Temporal Extension action in accordance with the present invention. The flowchart includes determining if the current de-interlace flag is set as WEAVE (S402); if negative, ending the procedure; otherwise, determining if there exits a predetermined number of flags set as BOB in the same position in the other flag buffers (S404); if negative, ending the procedure; otherwise, setting the de-interlace flags as BOB2 (S406). In fact the temporal extension action is a simplified temporal average filter. And this filter is only applied to those flags primarily judged as WEAVE while the output may be WEAVE or BOB2.

Figure 5:
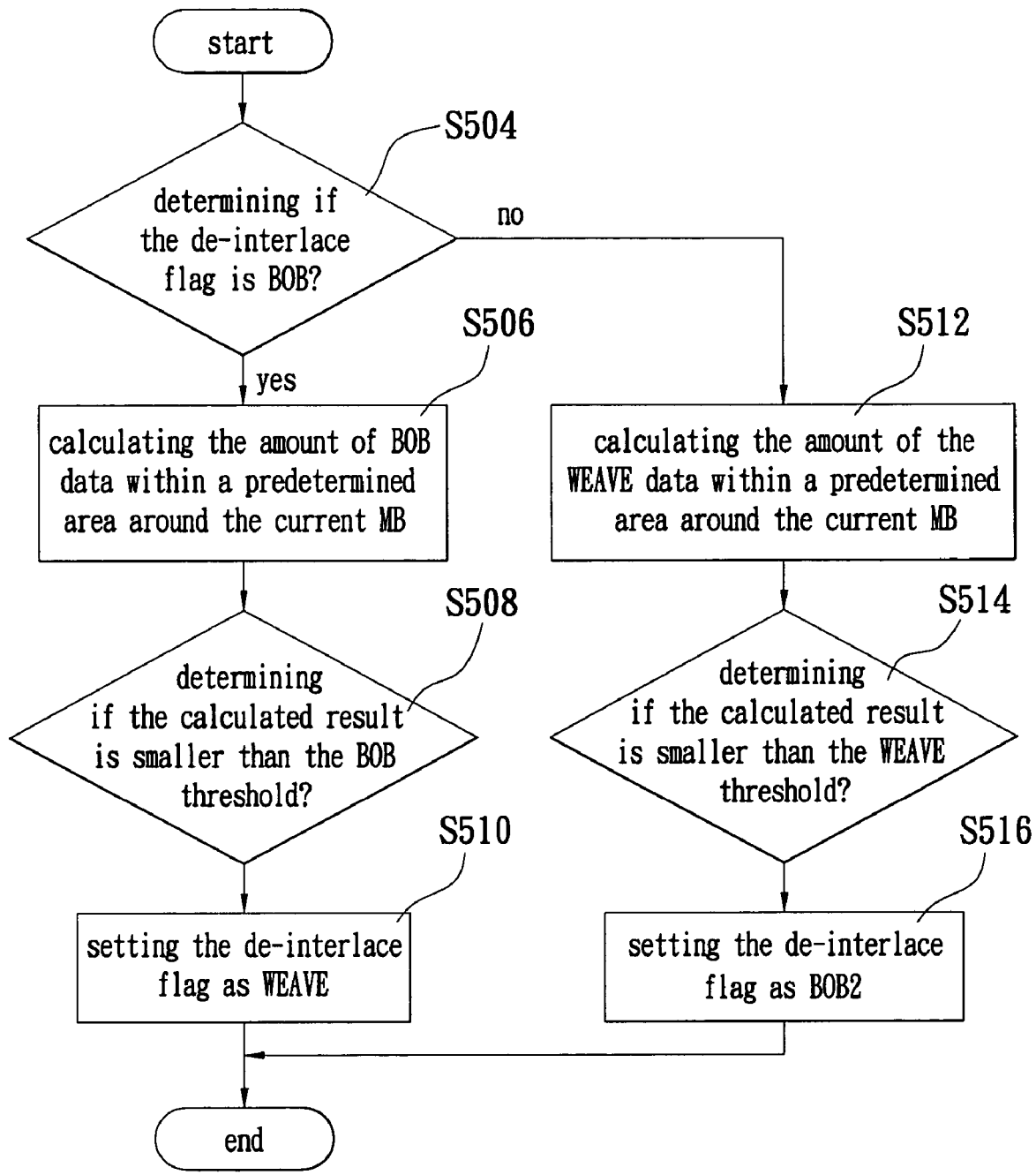
FIG. 5 is a flowchart for performing a Devour action in accordance with the present invention.

Reference is made to FIG. 5, which is a flowchart for performing a Devour action in accordance with the present invention. The flowchart includes: determining if the de-interlace flag is BOB (S504); if positive, calculating the amount of BOB data within a predetermined area around the current MB(S506); determining if the calculated result is smaller than the BOB threshold (S508); and setting the de-interlace flag as WEAVE (S510). If the result of Step S504 is negative, the amount of the WEAVE data within a predetermined area around the current MB is calculated (S512). Whether the calculated result is smaller than the WEAVE threshold is determined (S514) and the de-interlace flag is set as BOB2 (S516). In fact the devour action is a spatial average filter for these de-interlacing flags, i.e., for the de-interlacing bitmap.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:
1. A method for line average de-interlacing, comprising:
    decoding macro blocks (MBs) in a picture; calculating line average values of the MBs to form a threshold;
    producing de-interlacing flags according to the comparison between the line average differences and the threshold;
    realizing a Temporal Extension action via performing a temporal average filter to flags primarily judged as WEAVE; and
    performing a Devour action via spatial average filtering to the flags for a picture (the de-interlacing bitmap).

2. The method as claimed in claim 1, wherein the picture content is a motionless picture or a motion picture.

3. The method as claimed in claim 1, wherein the line average value is calculated via employing a full mode or a half mode.

4. The method as claimed in claim 3, wherein the full mode uses 32 bytes data within the MBs for decoding.

5. The method as claimed in claim 3, wherein the half mode uses 16 bytes data within the MBs for decoding.

6. The method as claimed in claim 1, wherein the threshold is adaptively formed by using the line average value and diagonal pixel data of the picture content.

7. The method as claimed in claim 1, wherein the step of producing the de-interlacing flags comprises:
   producing the de-interlacing flags and setting the de-interlace flags as BOB if the difference between current line average values and line average values in the same position MB in a previous frame is bigger than the threshold; and
   producing the de-interlacing flag as WEAVE if the difference between the current line average values and the line average values in the same position MB in the previous frame is equal to or smaller than the threshold.

8. The method as claimed in claim 1, wherein the step of realizing the Temporal Extension action further comprises:
   determining if one of the de-interlace flag is set as WEAVE;
   determining if the flags in the other flag buffers are set as BOB; and
   setting the de-interlace flags as BOB2.

9. The method as claimed in claim 1, wherein the step of performing the Devour action further comprises:
   calculating an amount of BOB data within a predetermined area around acurrent MB to form a first calculated result; and
   setting the de-interlace flags as WEAVE.

10. The method as claimed in claim 9, wherein the step comprises:
    determining if the de-interlace flags are set as BOB.

11. The method as claimed in claim 10, further comprising the following steps if a determination result of determining if the de-interlace flags are set as BOB is negative:
    calculating an amount of WEAVE data within a predetermined area around a current MB to form a second calculated result;
    determining if the second calculated result is smaller than a WEAVE threshold; and
    setting the de-interlace flags as BOB2.

12. The method as claimed in claim 9, wherein the step of calculating further comprises:
    determining if the first calculated result is smaller than a BOB threshold.

* * * * *